(12) United States Patent
Gomez

(10) Patent No.: US 11,939,072 B2
(45) Date of Patent: Mar. 26, 2024

(54) METHOD OF OPTIMIZING THE NOISE GENERATED ON THE GROUND BY A ROTORCRAFT

(71) Applicant: AIRBUS HELICOPTERS, Marignane (FR)

(72) Inventor: Nayibe Gomez, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 634 days.

(21) Appl. No.: 16/782,246

(22) Filed: Feb. 5, 2020

(65) Prior Publication Data

US 2020/0331621 A1 Oct. 22, 2020

(30) Foreign Application Priority Data

Feb. 12, 2019 (FR) ........................................ 1901399

(51) Int. Cl.
*B64D 31/06* (2006.01)
*B64D 27/02* (2006.01)
*B64F 5/60* (2017.01)

(52) U.S. Cl.
CPC ................ *B64D 31/06* (2013.01); *B64F 5/60* (2017.01); *B64D 27/026* (2024.01)

(58) Field of Classification Search
CPC ........................... B64D 31/06; B64D 2027/026
See application file for complete search history.

(56) References Cited

U.S. PATENT DOCUMENTS

| 2010/0013223 | A1 | 1/2010 | Certain |
| 2011/0024555 | A1 | 2/2011 | Kuhn, Jr. |
| 2012/0043413 | A1 | 2/2012 | Smith |
| 2013/0092789 | A1 | 4/2013 | Botti et al. |

(Continued)

FOREIGN PATENT DOCUMENTS

| CA | 2465271 C | * | 9/2011 | ............. F03D 15/00 |
| EP | 2148066 A1 | | 1/2010 | |

(Continued)

OTHER PUBLICATIONS

French Search Report for French Application No. FR 1901399, Completed by the French Patent Office, dated Nov. 12, 2019, 9 pages.

(Continued)

*Primary Examiner* — Timothy D Collins
*Assistant Examiner* — Terri L Filosi
(74) *Attorney, Agent, or Firm* — Brooks Kushman P.C.

(57) ABSTRACT

A method of optimizing the noise generated by a rotorcraft on the ground, said rotorcraft including a hybrid power plant, at least one rotor, and an electrical energy source. Said method makes it possible to monitor whether each engine of said power plant is on or off, and to monitor the state of each electric machine of said hybrid power plant. Said method also makes it possible to monitor whether said rotorcraft is on the ground. Then, each engine that is on is controlled to reach an idling speed, or indeed to be caused to stop by being switched off, and said electric machine Is regulated on a setpoint speed of rotation of a rotor so as to drive each rotor while also limiting the noise generated by said hybrid power plant.

18 Claims, 1 Drawing Sheet

(56) References Cited

U.S. PATENT DOCUMENTS

| | | | |
|---|---|---|---|
| 2014/0054411 A1* | 2/2014 | Connaulte | B64D 27/24 244/17.13 |
| 2014/0117148 A1* | 5/2014 | Dyrla | B64D 35/08 244/17.13 |
| 2014/0145028 A1* | 5/2014 | Gomez | B64D 31/06 244/58 |
| 2014/0283519 A1 | 9/2014 | Mariotto et al. | |
| 2015/0006057 A1* | 1/2015 | Domingo | F01D 21/02 701/99 |
| 2016/0375994 A1 | 12/2016 | Rossotto | |
| 2018/0009542 A1 | 1/2018 | Kuster | |

FOREIGN PATENT DOCUMENTS

| | | |
|---|---|---|
| EP | 2571764 A1 | 3/2013 |
| FR | 3003514 A1 | 9/2014 |
| FR | 3036235 A1 | 11/2016 |
| FR | 3039614 A1 | 2/2017 |
| WO | 2011144690 A1 | 11/2011 |

OTHER PUBLICATIONS

Canadian Office Action dated Mar. 31, 2021 (with English Machine Translation), Application No. 3,070,485, Applicant Airbus Helicopters, 8 Pages.

\* cited by examiner

METHOD OF OPTIMIZING THE NOISE GENERATED ON THE GROUND BY A ROTORCRAFT

CROSS-REFERENCE TO RELATED APPLICATIONS

This application claims priority to French patent application No. FR 19 01399 filed on Feb. 12, 2019, the disclosure of which is incorporated in its entirety by reference herein.

BACKGROUND OF THE INVENTION

(1) Field of the Invention

The present invention lies in the field of power plants for rotorcraft, and in particular in the narrower field of hybrid power plants.

(2) Description of Related Art

The present invention relates to a method of optimizing the noise generated on the ground by a rotorcraft.

A rotorcraft, also referred to as a "rotary-wing aircraft", conventionally has a fuselage and at least one main rotor that is driven in rotation by a power plant and that provides, at least partially, the lift and/or the propulsion for the rotorcraft. The rotorcraft may also be provided with an anti-torque device. An anti-torque device is sometimes constituted by an auxiliary rotor that is generally situated at the rear end of the rotorcraft, e.g. at the end of a tail boom of the rotorcraft, and that is driven in rotation by the power plant of the rotorcraft.

A rotorcraft may also have a plurality of main rotors that simultaneously and at least partially provide the lift and/or propulsion for the rotorcraft.

A rotorcraft may also have one or more forward propulsion propellers, e.g. placed on either side of the fuselage, and optionally on wings of the rotorcraft. The propellers are generally driven in rotation by the power plant of the rotorcraft.

The power plant of the rotorcraft may have one or more fuel-burning engines, e.g. gas turbines or piston engines, and one or more mechanical power transmission gearboxes.

While it is operating, a rotorcraft thus has various potentially noisy sources, namely each engine, each gearbox, each main rotor, and, possibly, each auxiliary rotor and each propeller.

The noise generated by an engine is caused, firstly, by the successive combustions of the fuel, and secondly by the mechanical elements of the engine, such as, in particular, the rotary blades in a gas turbine. Such noise generated by an engine can vary, in particular with variations in the operating parameters of the engine, such as its speed of rotation, its temperature, or indeed the torque it delivers, for example. Such noise might also vary with variations in the conditions under which the engine is used, in particular in the temperature and atmospheric pressure outside the engine.

The noise generated by a gearbox is mainly caused by the rotary elements such as the shafts and bearings of the gearbox, as well as by the gearing elements for reducing or increasing the speed of rotation, such as the gear wheels and/or other meshing elements of the gearbox. Such noise generated by a gearbox varies mainly with variations in the speeds of rotation of its rotary elements and of its gearing elements for reducing or increasing speeds of rotation.

The noise generated by each main rotor, by each auxiliary rotor and/or by each propeller is caused by the aerodynamic behaviors of their blades. Such noise generated by each rotor and/or by each propeller varies as a function of the conditions under which each of them is used and thus as a function of the flight phase of the rotorcraft.

The noise generated by a rotorcraft can cause problems as regards having the rotorcraft accepted, in particular by the neighborhoods around the landing areas, such as aerodromes or airports, and in the urban or rural-urban fringe areas over which the rotorcraft can fly at low altitudes. The passengers of the rotorcraft and the crew operating on the ground on and around the rotorcraft also suffer from such noise and are also increasingly demanding that the noise to which they are subjected in the environment around the rotorcraft be reduced.

In addition, even when it is on the ground, a rotorcraft may need to have its main rotor, as well as its anti-torque tail rotor, or indeed any propellers it might have, rotate for various operational, maintenance, or indeed safety reasons.

For example, when the rotorcraft is subjected to high wind, it can be necessary to have the main rotor rotate so that its blades do not touch the fuselage of the rotorcraft under the effect of the wind. Operations for loading or indeed unloading the rotorcraft can then take place without being hindered by the blades of the main rotor.

This can also be necessary for specific maintenance operations or indeed for checking operation of the main rotor, of the anti-torque tail rotor, or indeed of any propellers the rotorcraft might have.

The main rotor can thus be kept rotating for safety reasons, after the rotorcraft has landed, in order to make it easier for the rotorcraft to take off again in an emergency.

Usually, the energy necessary for rotating the main rotor, the anti-torque tail rotor, or indeed the propellers, is delivered entirely by at least one engine of the power plant of the rotorcraft. Consequently, on the ground, most of the noise emitted by the rotorcraft is generated by each engine, and can constitute a very unpleasant or annoying nuisance for people in the vicinity of the rotorcraft, for the passengers of the rotorcraft, and for the neighborhoods around airports.

Furthermore, Document EP 2 148 066 is known that discloses a hybrid power plant or "engine installation" provided with at least one turboshaft engine and with at least one electric machine, that hybrid power plant being designed to drive a mechanical power transmission gearbox in rotation. When in motor mode, each electric machine makes it possible transform electrical energy into mechanical energy in order to participate in driving the gearbox in addition to each turboshaft engine. During a flight, each electric machine can also operate in electricity generator mode in order to transform mechanical energy into electrical energy, thereby generating electric current. When in motor mode, an electric machine can also serve to start a turboshaft engine.

Document FR 3 036 235 discloses a method of operating a hybrid power plant having at least two fuel-burning engines and an electric motor, that power plant being designed to drive a rotor of a rotorcraft in rotation. That method determines under what conditions the electric motor drives the rotor jointly with one or more fuel-burning engines. In particular, the electric motor can be used only in predetermined flight phases, and thus while the rotorcraft is not standing on the ground, and while at least one fuel-burning engine is considered to have failed.

The prior art includes Document EP 2 571 764 that discloses a rotorcraft equipped with a hybrid power plant comprising a fuel-burning engine, an electric motor, and an electricity generator. The engine drives the electricity generator in rotation in order to generate electrical energy used for electrically powering the electric motor. The electric motor is connected to the main rotor of the rotorcraft in order to drive it in rotation. That hybrid power plant can further comprise one or more electrical energy storage devices, firstly so as to store at least a portion of the electrical energy generated by the electricity generator, and secondly so as to power the electric motor independently of operation of the engine.

The prior art also includes Document FR 3 003 514 that discloses various architectures for a hybrid power plant for an aircraft, as well as Documents US 2011/024555 and US 2012/043413 that disclose aircraft having rotors that are tiltable.

BRIEF SUMMARY OF THE INVENTION

An object of the present invention is therefore to optimize the noise generated on the ground by a rotorcraft, firstly, for example, so as to improve the comfort of the maintenance crew and of the passengers of the rotorcraft, and secondly, for example, so as to limit generation of noise that can be a nuisance for the environment around the rotorcraft, in particular in urban or rural-urban fringe areas. To achieve this object, the rotorcraft uses a hybrid power plant that includes a mechanical energy source in addition to the fuel-burning engines, and that includes, in particular, at least one electric machine associated with an electrical energy source in order to drive in rotation the main rotor of the rotorcraft on the ground.

The present invention provides a method of optimizing the noise generated by a rotorcraft on the ground. Said rotorcraft includes, for example:
- a hybrid power plant provided with at least one fuel-burning engine and with at least one electric machine;
- at least one rotor driven in rotation by the hybrid power plant;
- a management system for managing the hybrid power plant, which system is provided with a calculator, with at least one control unit for controlling said at least one engine, and with a control device for controlling each electric machine, which device controls and manages operation of said at least one electric machine; and
- at least one electrical energy source electrically powering at least one electric machine via an electrical network of the rotorcraft.

The method of the invention for optimizing the noise generated by a rotorcraft on the ground is remarkable in that it includes the following steps:
- a first monitoring step for monitoring whether the rotorcraft is on the ground;
- a second monitoring step for monitoring whether each engine is in the started or "on" state or in the stopped or "off" state, and for monitoring its speed if it is in the on state;
- a third monitoring step for monitoring whether each electric machine is in the on state or in the off state, and for monitoring its speed if it is in the on state;
- a first control step for controlling at least one engine from among the engine(s) in the on state, if the rotorcraft is on the ground, so as to control the speed of the at least one engine until said at least one engine reaches a predetermined speed referred to as a "silent speed"; and
- a second control step for controlling at least one electric machine so that the at least one electric machine delivers mechanical power for driving each rotor.

The method of the invention thus makes it possible to set in rotation each rotor of the rotorcraft, in particular a main rotor, mainly by means of at least one electric machine, thereby limiting the sound level of the noise generated by the rotorcraft, and in particular by its hybrid power plant. Consequently, the noise nuisance of the rotorcraft on the ground is reduced.

This method may be performed after an order either from a pilot of the rotorcraft or else from the maintenance staff requiring silent rotation of each rotor, e.g. via a switch or a button present on the instrument panel of the rotorcraft or indeed on an electrical control panel of the rotorcraft that is dedicated to maintenance.

Each electric machine of the hybrid power plant of the rotorcraft co-operates with the at least one electrical energy source to form a supplementary mechanical energy source that is suitable for driving each rotor of the rotorcraft in rotation, in particular via a mechanical power transmission gearbox of the hybrid power plant. In this way, each electric machine advantageously makes it possible to drive each rotor of the rotorcraft while limiting generation of noise that can constitute a nuisance for the environment around the rotorcraft.

In this way, each electric machine makes it possible to take the place of or to supplement at least one engine so as to drive each rotor when the rotorcraft is on the ground. Consequently, at least one engine of the hybrid power plant can be slowed down, or indeed be stopped by being switched off, each rotor of the rotorcraft still being driven in rotation by at least one electric machine so as to reduce to some extent or advantageously to zero the noise generated by each engine.

The first monitoring step of the method of the invention makes it possible to monitor the state of the rotorcraft, and in particular to define whether the rotorcraft is indeed on the ground, or whether the rotorcraft is in flight. This is because the method of the invention concerns only a rotorcraft standing on the ground. Therefore, the method of optimizing the noise generated by a rotorcraft on the ground does not provide any reduction in noise when the rotorcraft is not on the ground. For example, this first monitoring step may be performed by means of a detection device of the rotorcraft that is capable of determining whether the rotorcraft is on the ground. For example, the detection device may include a pressure sensor in the undercarriage or indeed a system for measuring the forces in the undercarriage, which sensor or system is suitable for thereby detecting whether the undercarriage is in contact with the ground. The detection device may also include a system for measuring proximity to the ground or indeed a radio altimeter.

The first monitoring step may also be performed by a pilot of the rotorcraft via a switch or a button present on the instrument panel of the rotorcraft, for example.

The second monitoring step for monitoring the state of each engine makes it possible to monitor the state of each engine and to determine, in particular, whether each engine of the hybrid power plant is in a started state designated "on state" or in a stopped state designated "off state". In addition, this second monitoring step makes it possible, when at least one engine is in the on state, to determine the operating characteristics of each engine in the on state, in particular the torque developed, the operating speed, and/or the mechanical power delivered.

The state of an engine of the hybrid power plant is monitored, for example, via a control unit associated with said engine.

The third monitoring step for monitoring the state of each electric machine makes it possible, similarly to the second monitoring step, to monitor the state of each electric machine of the hybrid power plant and to determine, in particular, whether each electric machine is in an on state or in an off state. In addition, this third monitoring step makes it possible, when at least one electric machine is in the on state, to determine the operating characteristics of said at least one electric machine in the on state, in particular the torque developed, the operating speed, and the mechanical power delivered.

In the context of the invention, an electric machine is considered to be in the on state whenever it is electrically powered, regardless of whether said electric machine is delivering mechanical power or is not delivering any mechanical power. An electric machine is considered to be in the off state whenever said electric machine is not electrically powered.

The state of an electric machine of the hybrid power plant is monitored, for example, by means of a control device associated with said electric machine.

In addition, in the context of the invention, the operating speed of an engine or of an electric machine defines its speed of rotation.

These three monitoring steps may be performed sequentially. However, a preferred implementation of the method of the invention makes provision to perform the three monitoring steps in parallel, substantially simultaneously. When the three monitoring steps are performed sequentially, it may be preferable to perform the first monitoring step first, so as possibly not to perform the other two monitoring steps if the rotorcraft is not standing on the ground, even though it is possible to perform these steps in different sequence orders.

Then, if the presence of the rotorcraft on the ground is confirmed by the first monitoring step, the following steps of the method of the invention can be performed.

Firstly, if at least one engine is detected as being in the on state, a first control step for controlling at least one engine from among the engine(s) in the on state is performed. This first control step for controlling at least one engine aims to optimize and, consequently, to reduce if necessary, the level of noise generated by the rotorcraft, and by its hybrid power plant in particular. To this end, the first control step for controlling at least one engine makes it possible to control the speed of said engine so that said engine reaches a predetermined silent speed, e.g. by means of the control unit associated with said engine.

If the rotorcraft has a single engine or indeed if only one engine is detected as being on, the first control step for controlling at least one engine is applied only to that single or one engine that is on. The first control step then controls the speed of said single or one engine so that it reaches the predetermined silent speed.

If the rotorcraft has a plurality of engines detected as being on, at least two alternatives are possible.

In a first alternative, the first control step for controlling at least one engine is applied to all of the engines that are on. The first control step then controls the speed of all of those engines so that they reach the predetermined silent speed.

In a second alternative, when the power plant includes at least two engines detected as being on, the first control step for controlling at least one engine is applied to the engine detected as being on that is situated in a specific zone of the rotorcraft or indeed in the vicinity of said specific zone in which the sound level of the noise generated by the rotorcraft is to be reduced. The first control step then controls the speed of that one engine so that it reaches the predetermined silent speed.

The noise generated by the power plant may be reduced as a priority in a specific zone of the rotorcraft in which, for example, a maintenance operation is in progress, or indeed via which the passengers of the rotorcraft are embarking onto or disembarking from the rotorcraft. The information indicating such a specific zone in which the sound level of the noise generated by the rotorcraft is to be reduced is determined, if necessary, at the time performance of the method is ordered by a pilot of the rotorcraft or indeed by the maintenance crew, e.g. via a switch or a button present on the instrument panel of the rotorcraft or indeed on an electrical control panel of the rotorcraft.

For example, when at least two engines detected as being on are arranged transversely side-by-side, the first control step for controlling at least one engine is applied only to the engine detected as being on that is situated on a specific side of the rotorcraft where the sound level of the noise generated by the rotorcraft is to be reduced. The first control step then controls the speed of that engine only, so that it reaches the predetermined silent speed.

In any event, regardless of whether one engine or a plurality of engines is/are detected as being on, the predetermined silent speed of an engine detected as being on may be zero, i.e. may result from the engine being stopped by being switched off. The speed of the engine is then reduced until the engine stops, thereby reducing the noise generated by the engine to zero, i.e. eliminating said noise completely.

The predetermined silent speed of an engine may also make it possible to keep the engine in the on state, but at a non-zero predetermined silent speed. The predetermined silent speed is a speed of the engine that is preferably reduced and that makes it possible to reduce to a considerable extent the noise generated by the engine, while also advantageously keeping the engine in the on state and therefore rapidly ready for the rotorcraft taking off again. For example, the predetermined silent speed may be an idling speed of the engine.

In parallel to this first control step for controlling at least one engine detected as being in the on state, a second control step for controlling each electric machine is performed. Each electric machine is then caused to deliver mechanical power in order to drive each rotor of the rotorcraft in rotation. For example, the delivery of mechanical power by each electric machine may be performed and regulated on a setpoint speed of rotation of a rotor, in particular the main rotor of the rotorcraft, and possibly as a function of the mechanical power delivered by at least one engine in the on state. In this way, each electric machine delivers mechanical power supplementary to any mechanical power delivered by at least one engine detected as being on in order to drive each rotor of the rotorcraft, while also advantageously limiting the noise generated by the hybrid power plant.

To this end, the second control step for controlling each electric machine makes it possible, e.g. via the control device associated with said electric machine, to control the speed of said electric machine and the mechanical power delivered by said electric machine in order to comply with the setpoint speed of rotation of a rotor, in particular the main rotor.

Delivery of mechanical power by an electric machine may require the electric machine to be powered first during the second control step if said electric machine is in the off state.

Furthermore, if no engine of the hybrid power plant has been detected as being on, the first control step for controlling at least one engine is not performed, and the second control step for controlling each electric machine is performed so that each electric machine on its own drives each rotor of the rotorcraft in rotation in compliance with the setpoint speed of rotation of a rotor.

In the context of the invention, at least one electric machine of the hybrid power plant is an electric motor performing a drive function only, or else it is a reversible machine suitable for operating in motor mode or in electricity generator mode in order to deliver mechanical power to each rotor of the rotorcraft. The maximum power delivered by each electric machine of the hybrid power plant of the rotorcraft without damaging said electric machine may lie typically in the range of 15% of the maximum power delivered by each engine of said hybrid power plant to 25% of the maximum power delivered by each engine of said power plant, in order to limit, in particular, the weight of the electric machine.

In addition, an engine may be a piston engine or else, more generally on rotorcraft, a gas turbine or turboshaft engine comprising a gas generator and a free turbine.

An electric machine may be installed permanently in the hybrid power plant of the rotorcraft and may be placed in different positions inside said hybrid power plant of the rotorcraft. Document FR 3 039 614 in particular discloses installation configurations for an electric machine as coupled to a gearbox of the hybrid power plant, to the engine, or indeed directly to the main rotor of the rotorcraft.

For example, when the engine is a gas turbine or turboshaft engine, an electric machine may be installed between the free turbine and the gearbox. The electric machine thus delivers mechanical power to the gearbox.

In another example, a power electric machine may be installed on a specific and dedicated inlet of the gearbox and thus deliver mechanical power directly to the gearbox.

An electric machine may also be installed on the hub of the main rotor of the rotorcraft in order to deliver mechanical power directly to the hub of the main rotor.

An electric machine may also be installed temporarily and when necessary as a temporary drive device used on the ground.

The electric machine may thus be disposed on a specific mechanical power take-up of the rotorcraft enabling the main rotor to be driven in rotation by the electric machine. Said specific mechanical power take-up is arranged on a mechanical transmission system for each rotor. In particular, said mechanical power take-up is an external mechanical power take-up of the gearbox. The electric machine may also be installed in place of an engine that has been removed from the rotorcraft for a maintenance operation.

In such a situation, the method of the invention includes a prior step for arranging an electric machine in place of an engine or indeed on a mechanical power take-up of the rotorcraft. This first prior step is performed before the steps mentioned above.

In addition, each electric machine of the hybrid power plant of the rotorcraft may be powered by one or more electrical energy sources.

An electrical energy source may be permanently on board the rotorcraft. An electrical energy source may, for example, be an electrical energy storage device, such as an electric battery or indeed a fuel cell. An electrical energy source may also be an electricity generator driven in rotation by a dedicated engine or indeed by an engine of the hybrid power plant of the rotorcraft.

An electrical energy source may also be external to the rotorcraft and connected to the rotorcraft on the ground temporarily and when necessary via an external electrical power socket or receptacle, also referred to as the "ground power receptacle". The ground power receptacle is connected electrically to at least one electric machine via the electrical network of the rotorcraft. Such an external electrical energy source may, for example, be an electrical energy storage device or an electricity generator driven in rotation by a dedicated engine.

In such a situation, the method of the invention includes a second prior step for plugging an electrical energy source external to the rotorcraft into a ground power receptacle on the rotorcraft. This second prior step is also performed before the steps mentioned above.

Furthermore, the hybrid power plant may include a first coupling device arranged between at least one engine and a gearbox. The hybrid power plant may also include a second coupling device arranged between at least one electric machine and a mechanical transmission system driving each rotor of the rotorcraft in rotation, in particular between at least one electric machine and the hub of the main rotor of the rotorcraft.

The first coupling device thus makes it possible to avoid driving the engine in question in rotation when each rotor of the rotorcraft is driven in rotation by at least one electric machine only. Similarly, the second coupling device makes it possible to avoid driving the electric machine in question in rotation when each rotor of the rotorcraft is driven in rotation by at least one engine only. For example, the first coupling device and the second coupling device each comprise a clutch or a freewheel.

In addition, the system for managing the hybrid power plant includes a calculator, e.g. provided with a memory and with a processor. The memory can store instructions and the calculator makes it possible to run the steps of the method of the invention for optimizing the noise generated by a rotorcraft on the ground, in particular as a function of the instructions.

The calculator may further include an integrated circuit, a programmable system, one or more logic circuits, a computer, or indeed any equivalent device, these examples not limiting the scope given to the meaning of the term "calculator".

The system for managing the hybrid power plant may also include at least one control unit for controlling and managing operation of each engine and at least one control device for controlling and managing operation of each electric machine.

A control unit makes it possible, in particular, to switch on, i.e. start, and switch off, i.e. stop, an engine, and to control and change the speed of said engine in order to regulate operation thereof. For example, the control unit may comprise a unit known in the field of rotorcraft as an Electronic Engine Control Unit (EECU), or indeed an engine calculator known as a Full Authority Digital Engine Control (FADEC).

A control device makes it possible, in particular, to control electrical powering of an electric machine and interrupting of said electrical powering, as well as to control and to change the speed of the electric machine in order to regulate operation thereof. Such a control device includes a calculator and is, for example an Electronic Speed Controller (ESC). The Electronic Speed Controller (ESC) may include an internal electronic circuit or "Battery Eliminator Circuit" (BEC) making it possible to regulate the voltage powering each electric machine.

In addition, the method of the invention for optimizing the noise generated by a rotorcraft on the ground may include an additional determination step for determining the speed of the wind around the rotorcraft. This determination step is performed in parallel with the monitoring steps and with the second control step for controlling each electric machine. For example, this determination step is performed by means of an anemometer with which the rotorcraft is provided and which measures the wind speed, or indeed by means of a weather station situated in the vicinity of the rotorcraft.

If the wind speed is greater than a predetermined limit, namely a limit stored in a memory, the driving in rotation of each rotor by each electric machine is not performed or is stopped if it is being performed in order to avoid damage to each electric machine. Consequently, the second control step for controlling each electric machine is not performed or is stopped if it is being performed. A pilot of the rotorcraft may also decide not to perform or indeed to stop the driving in rotation of each rotor by each electric machine if the pilot deems that the wind speed is too high, typically after having consulted a windsock situated in the vicinity of the rotorcraft. For example, the pilot of the rotorcraft may transmit his or her decision via a switch or a button present on the instrument panel of the rotorcraft.

The rotation of each rotor may be stopped by stopping mechanical power being delivered by each electric machine, by interrupting the electrical powering of each electric machine, or indeed by completely stopping the method of the invention. For example, the predetermined limit may be equal to 30 knots, one knot being equal to 1.852 kilometers per hour or 1.151 miles per hour.

The method may also include a fourth monitoring step for monitoring the electrical network so as to monitor whether the electrical network of the rotorcraft is capable of powering each electric machine. The electrical network is considered capable of powering each electric machine if it can deliver sufficient electrical power and has sufficient electrical energy for powering each electric machine so that each electric machine delivers sufficient mechanical power. The electrical power of the electrical network is characterized by the voltage and the current that the network can deliver to each electric machine. The electrical energy can be characterized by the capacity of the electrical energy source to deliver electrical power for a certain length of time. When said electrical energy source is a battery, the electrical energy of the battery is characterized by its capacity and its state of charge in voltage terms.

If the electrical network is capable of powering each electric machine, an authorization to power each electric machine is then issued. This authorization to power may, in particular, be a condition necessary for performing the first control step for controlling at least one engine, and for performing the second control step for controlling each electric machine.

The method may also include an anticipated switch-on step for switching on each electric machine in anticipation subsequently to the fourth monitoring step for monitoring the electrical network. During the anticipated switch-on step, each electric machine is switched on as soon as the authorization to power is issued, without transmitting mechanical power to the rotor. In this way, each electric machine may deliver mechanical power almost instantaneously as soon as the second control step is performed.

The method of the invention for optimizing the noise may also include a protection step made up of two sub-steps. A first sub-step for determining the speed of rotation of at least one rotor is performed and then, if the speed of rotation of a rotor is greater than a predetermined speed, a second sub-step for switching off each electric machine is performed. This additional protection step thus makes it possible to avoid at least one rotor reaching overspeed when it is driven by each electric machine.

In addition, in parallel with the second control step for controlling each electric machine, the fourth monitoring step for monitoring the electrical network may also be performed in order to monitor the electrical network of the rotorcraft so as to determine whether the electrical network is still capable of electrically powering each electric machine, and, in particular, whether each electrical energy source has sufficient electrical energy. If the fourth monitoring step for monitoring the electrical network determines that the electrical network does not have sufficient electrical capacity, an order to switch off each electric machine is generated and an electric machine switch-off step is performed.

In addition, the method of the invention for optimizing the noise may also include additional steps for switching off each electric machine and for having each rotor driven by each engine before starting a takeoff procedure for takeoff of the rotorcraft.

The second monitoring step for monitoring the state of each engine is performed again in order to determine whether each engine of the hybrid power plant of the aircraft is in an on state or in an off state, and in order to determine the speed of each engine.

If at least one engine is in the off state, a switch-on order is generated and a step for switching on, i.e. starting, the engine is performed.

The method of the invention for optimizing the noise then includes a regulation step for regulating each engine of the hybrid power plant in order to bring each engine to a state enabling it to drive at least one rotor, while complying with a predetermined setpoint speed of rotation. As soon as each engine reaches the state in which the predetermined setpoint speed of rotation is complied with, an order to switch off each electric machine is generated.

Finally, a step for switching off each electric machine is performed, making it possible to switch off, i.e. to stop, each electric machine. The predetermined setpoint speed of rotation is complied with because the power delivered by the engines increases progressively and in parallel with the decrease in the power delivered by the electric machine until it stops. During this step for switching off each electric machine, the speed of each electric machine is, for example, reduced until it reaches a speed of rotation of zero and the electrical powering of each electric machine is then interrupted.

These additional steps thus make it possible to go over from silent rotation of each rotor to a takeoff phase, without the rotation of each rotor being stopped, and thereby optimizing the energy consumed for going into the takeoff phase for enabling the rotorcraft to take off.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Figure 1:
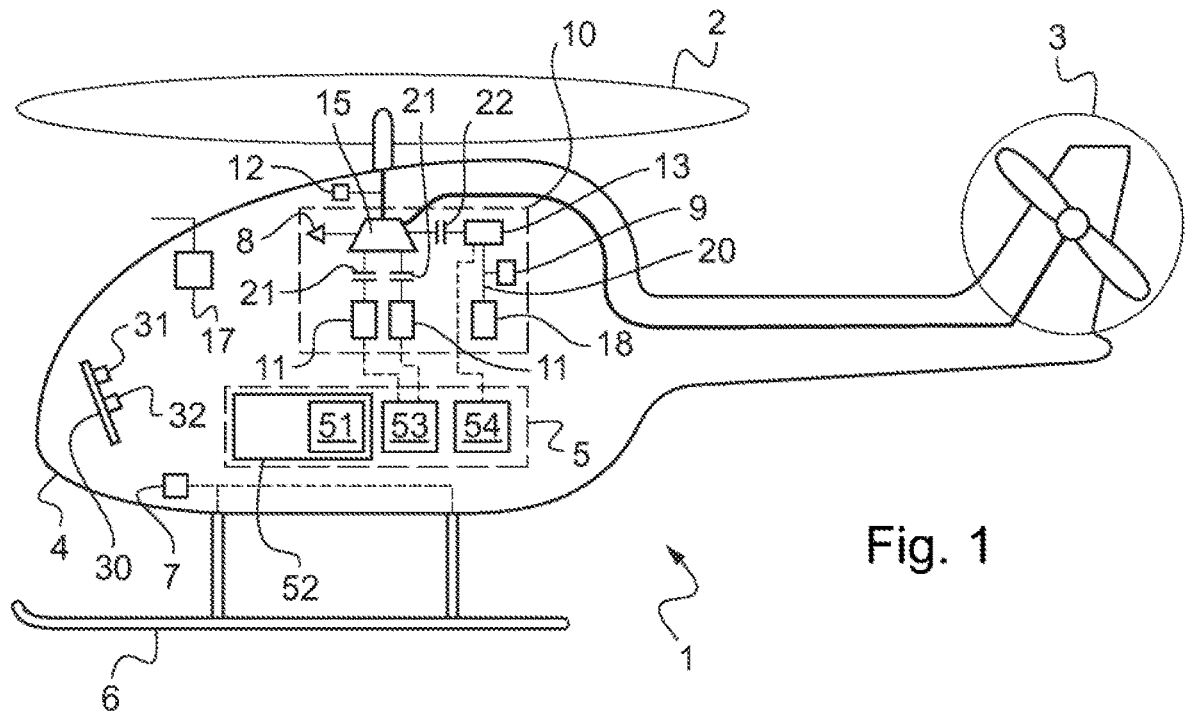
FIG. 1 shows a rotorcraft.

The rotorcraft 1 shown in FIG. 1 has a fuselage 4, an undercarriage 6 having skids, a hybrid power plant 10, and two rotors 2, 3 driven in rotation by the hybrid power plant 10. More precisely, the two rotors 2, 3 are constituted by a main rotor 2 arranged above the fuselage 4, and by an anti-torque tail rotor 3 arranged on a tail boom of the rotorcraft 1.

The hybrid power plant 10 includes two fuel-burning engines 11, one electric machine 13, and one mechanical power transmission gearbox 15. The two engines 11 and the electric machine 13 are connected mechanically to the gearbox 15. The gearbox 15 is connected mechanically to both rotors 2, 3. In this way, the two engines 11 and the electric machine 13 can act either together or else independently from one another to drive the two rotors 2, 3 in rotation via the gearbox 15.

The gearbox 15 may also be provided with an external mechanical power take-up 8 designed to be connected to an external drive device, such as an electric machine, dedicated to setting the gearbox 15 in motion.

The hybrid power plant 10 may also be provided with coupling devices 21, 22, such as clutches or freewheels, for example, respectively connecting the engines 11 and the electric machine 13 to the gearbox 15.

These coupling devices 21, 22 enable, in particular, each engine 11 and the electric machine 13 to be capable of delivering mechanical power to the gearbox 15, whereas the gearbox 15 cannot deliver mechanical power to the engines 11 and to the electric machine 13.

The rotorcraft 1 also has an electrical energy source 18 that electrically powers the electric machine 13 via an electrical network 20, and a management system 5 for managing the hybrid power plant 10. For example, the management system 5 includes a calculator 52 provided with a memory 51, a control unit 53 for controlling the two engines 11, and a control device 54 for controlling the electric machine 13.

The control unit 53 serves to control and manage operation of each engine 11, and in particular to switch on or start, to switch off or stop, and to control the various speeds of each engine 11, as well as to regulate the speed thereof. The control device 54 serves to control and manage operation of the electric machine 13, and in particular to control electrical powering of the electric machine 13 and interruption in said electrical powering, and to regulate the speed of said electric machine 13.

The rotorcraft 1 is also provided with an external ground power socket or receptacle 9 that is connected electrically to the electric machine 13 via the electrical network 20. An electrical energy source external to the rotorcraft 1 may be connected to the ground receptacle 9 for the purpose of electrically powering the electric machine 13.

The rotorcraft 1 also has a detection device 7 that is capable of determining whether said rotorcraft 1 is standing on the ground. For example, said detection device 7 includes a pressure sensor in the undercarriage 6 and/or a system for measuring the forces in the undercarriage 6 and suitable for thereby detecting whether or not the undercarriage 6 is in contact with the ground.

The rotorcraft 1 also has an anemometer 17 for measuring the speed of the wind around the rotorcraft 1, as well as a determination device 12 for determining the speed of rotation of the main rotor 2. Finally, the aircraft 1 has an instrument panel 30 provided with a plurality of buttons 31, 32.

Figure 2:
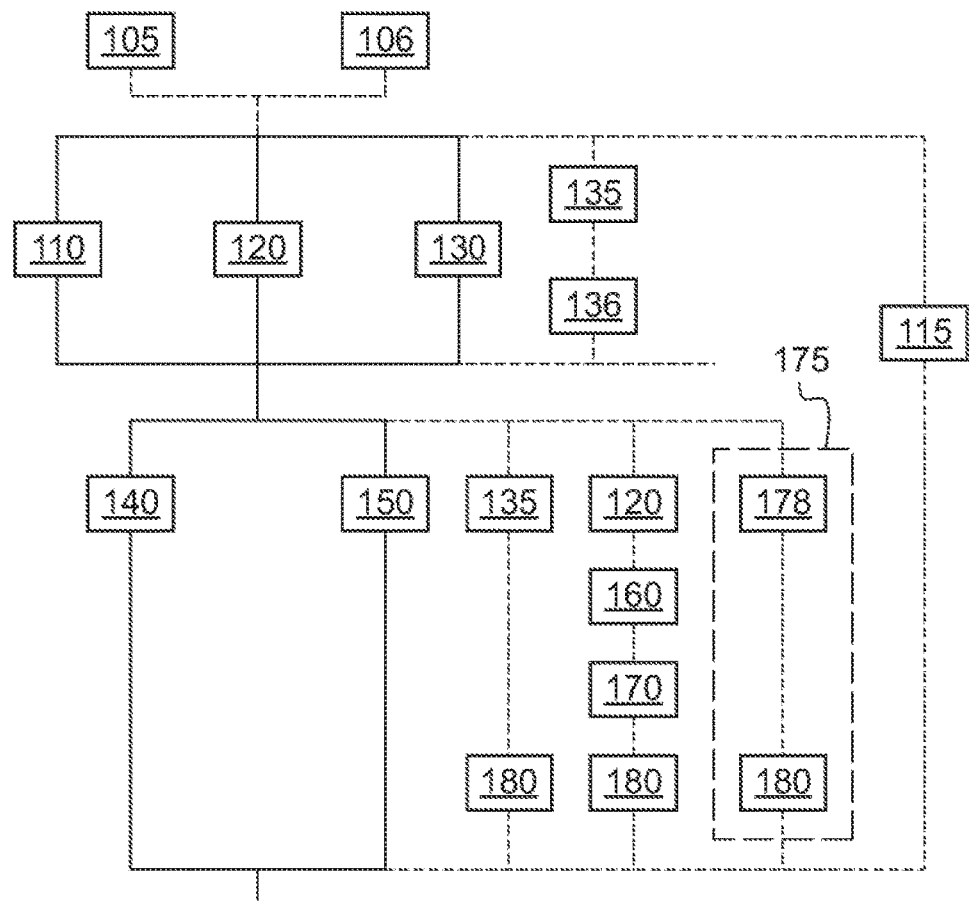
FIG. 2 is a block diagram showing a method of optimizing the noise generated by a rotorcraft on the ground.

The memory 51 stores instructions making it possible, in particular, to perform the method of optimizing the noise generated by a rotorcraft on the ground, a block diagram of which method is shown in FIG. 2. The calculator 52, which, for example, is formed by a processor or indeed by a logic circuit, makes it possible to perform the steps of the method.

This method of optimizing the noise generated by a rotorcraft on the ground may be performed following an order either from the pilot of the rotorcraft 1 or else from the maintenance crew requiring silent rotation of each rotor 2, 3 of the rotorcraft 1, e.g. via a first button 31 on the instrument panel 30.

Firstly, three monitoring steps 110, 120, and 130 are performed, preferably in parallel, although they may be performed sequentially.

A first monitoring step 110 makes it possible to define whether or not the rotorcraft 1 is standing on the ground. The first monitoring step 110 is performed by means of the detection device 7. The detection device 7 then delivers a first electrical signal to the calculator 52 of the management system 5, which signal contains information indicating that the rotorcraft 1 is standing on the ground or that it is not standing on the ground.

A second monitoring step 120 makes it possible to monitor the engines 11 and to determine whether each of said engines 11 is in an on state or in an off state, and to determine its respective speed. The second monitoring step 120 is performed by means of the control unit 53. The control unit 53 then delivers a second electrical signal to the calculator 52 of the management system 5, which signal contains information indicating the state of each engine 11 and optionally indicating its speed.

A third monitoring step 130 makes it possible to monitor the electric machine 13 and to determine whether the electric machine 13 is in an on state or in an off state, as well as to determine its speed. This third monitoring step 130 is performed by means of the control device 54. The control device 54 then delivers a third electrical signal to the calculator 52 of the management system 5, which signal contains information indicating the state of each electric machine 13 and optionally indicating its speed.

Then, if the presence of the rotorcraft 1 on the ground is confirmed by the first signal emitted by the first monitoring step 110, a first control step 140 for controlling at least one engine 11 and a second control step 150 for controlling the electric machine 13 are performed so as to drive each rotor 2, 3 in rotation while limiting the noise generated by the hybrid power plant 10 of the rotorcraft 1.

Firstly, if the second monitoring step 120 detects that at least one engine 11 is in the on state, that information being conveyed to the calculator 52 by the second signal, the first control step 140 controls the speed of at least one engine 11 in the on state by means of the control unit 53 associated with said engine 11 so that it reaches a predetermined "silent speed". The predetermined silent speed may be the off state of the engine 11, thereby reducing any noise generated by the engine 11 to zero. The predetermined silent speed may also keep the engine 11 in the on state, but with its speed then being reduced, e.g. to an idling speed, making it possible to reduce the generated noise to a considerable extent.

If a single engine 11 is detected in the on state, the first control step 140 is applied only to the singe engine 11 that is in the on state.

If both engines 11 of the rotorcraft 1 are detected as being in the on state, two alternatives are to be considered. The first control step 140 may then be applied to both engines 11 in the on state, or indeed to only one of the two engines 11 in the on state so as to reach the predetermined silent speed.

The two engines 11 of the hybrid power plant 10 may be arranged transversely side-by-side in the rotorcraft 1. While a maintenance operation is in progress on one side of the rotorcraft 1, or indeed while passengers of the rotorcraft 1 are embarking onto or indeed disembarking from the rotorcraft 1 on one side of the rotorcraft 1, it may be advantageous to reduce the noise generated by the engine 11 situated on that side of the rotorcraft 1 only, in order to reduce the noise nuisance for the maintenance crew or indeed for the passengers of the rotorcraft 1.

The choice of applying the first control step 140 to a single engine 11 or indeed to both engines 11, and the choice of the side on which the noise is to be reduced are made via a second button 32 on the instrument panel 30.

The second control step 150 for controlling the electric machine 13 is performed in parallel with the first control step 140. The second control step 150 controls the electric machine 13 via the control device 54 in such a manner that the electric machine 13 delivers mechanical power supplementary to any mechanical power delivered by each engine 11 in order to drive each rotor 2, 3 in rotation while complying with a setpoint speed of rotation of the main rotor 2.

In addition, if the second monitoring step 120 has detected that no engine 11 is in the on state, with that information having been conveyed to the calculator 52 by the second signal, the first control step 140 for controlling at least one engine 11 is not performed and only the second control step 150 for controlling the electric machine 13 is performed so that each rotor 2, 3 is driven in rotation by the electric machine 13. The electric machine 13 then delivers only the mechanical power necessary for rotating each rotor 2, 3 while complying with the setpoint speed of rotation.

In addition, the method of optimizing the noise generated by a rotorcraft 1 may also include an optional determination step 115 for determining the speed of the wind around the rotorcraft 1. This determination step 115 for determining the speed of the wind around the rotorcraft 1 is performed by means of the anemometer 17. If the wind speed monitored during the determination step 115 is greater than a predetermined limit, the second control step 150 for controlling the electric machine 13 is stopped in order to avoid damaging the electric machine 13. Said determination step 115 for determining the speed of the wind around the rotorcraft 1 is performed in parallel with the monitoring steps 110, 120, and 130 and with the second control step 150 for controlling the electric machine 13.

The method of optimizing the noise generated by a rotorcraft 1 may also include two optional steps, namely a fourth monitoring step 135 for monitoring the electrical network 20 and an anticipated switch-on step 136 for switching on the electric machine 13 in anticipation, these two optional steps being performed in parallel with the monitoring steps 110, 120, and 130.

The fourth monitoring step 135 for monitoring the electrical network 20 makes it possible to monitor whether the electrical network 20 is capable of powering the electric machine 13, by monitoring, in particular, the electrical power and the electrical energy that the electrical network 20 can deliver. The anticipated switch-on step 136 for switching on the electric machine 13 in anticipation is performed as soon as an authorization to power is issued following the fourth monitoring step 135. The electric machine 13 is thus switched on, without transmitting mechanical power to each rotor 2, 3 in anticipation of the second control step 150 for controlling the electric machine 13 being performed.

The method of optimizing the noise may also include an optional protection step 175 made up of two sub-steps, namely a determination first sub-step 178 for determining the speed of rotation of the main rotor 2 and a switch-off second sub-step 180 for switching off the electric machine 13. The determination first sub-step 178 makes it possible to determine a speed of rotation of the main rotor 2 by means of the determination device 12. Then, if the speed of rotation of the main rotor 2 is greater than a predetermined speed, the switch-off second sub-step 180 for switching off the electric machine 13 is performed in order to avoid the main rotor 2 reaching overspeed.

In addition, the method of the invention for optimizing the noise may also, optionally and in parallel with the second control step 150 for controlling the electric machine 13, apply the fourth monitoring step 135 for monitoring the electrical network 20 and then the switch-off sub-step 180 for switching off the electric machine 13, in order to monitor the electrical network 20 during the second control step 150. Thus, if the fourth monitoring step 135 detects that the electrical network 20 is no longer capable of electrically powering the electric machine 13, the switch-off sub-step 180 for switching off the electric machine 13 is performed.

The method of the invention for optimizing the noise may also optionally apply additional steps 120, 160, 170, and 180 for switching off the electric machine 13 and for having each rotor 2, 3 driven by the two engines 11 in preparation for the rotorcraft 1 taking off. These additional steps are performed in parallel with the first control step 140 and with the second control step 150.

Firstly, the second monitoring step 120 for monitoring the on or off state of the two engines 11 and possibly their speeds is performed again in order to determine the state of each engine 11. If at least one engine 11 is in the off state, said at least one engine 11 is switched on 160.

Then a regulation step 170 for regulating the two engines 11 is performed so that each engine 11 reaches a speed enabling it to be ready to drive the main rotor 2 while complying with a predetermined setpoint speed of rotation. The predetermined setpoint speed of rotation of the main rotor 2 is complied with by means of the power delivered by the electric machine 13, and consequently the engines 11 are ready but do not deliver the mechanical power.

Finally, the electric machine 13 is switched off 180 as soon as each engine 11 reaches a speed making it possible to drive the main rotor 2. The predetermined setpoint speed of rotation of the main rotor 2 is complied with, the engines 11 then being able to drive each rotor 2, 3 without the mechanical power from the electric machine 13.

In such a situation, the method of the invention includes a prior step 105 for arranging an electric machine 13 in place of an engine 11 or indeed on a mechanical power take-up 8 of the rotorcraft 1.

In such a situation, the method of the invention includes a second prior step 106 for plugging an electrical energy source 18 external to the rotorcraft 1 into a ground power receptacle 9 on the rotorcraft 1.

Naturally, the present invention can be the subject of numerous variants as to its implementation. Although several implementations are described, it should readily be understood that it is not conceivable to identify exhaustively all possible implementations.

In particular, a rotorcraft 1 having a plurality of lift main rotors 2, e.g. a rotorcraft 1 having four lift main rotors 2, may apply the method of optimizing the noise generated by a rotorcraft 1 on the ground as described.

It is naturally possible to envisage replacing any of the means described by equivalent means without going beyond the ambit of the present invention.

What is claimed is:

1. A method of optimizing the noise generated by a rotorcraft on the ground, the rotorcraft including a hybrid power plant provided with at least one engine and with at least one electric machine, at least one rotor driven in rotation with mechanical power from the hybrid power plant, and at least one electrical energy source electrically powering the at least one electric machine via an electrical network, the method comprising:
   a first monitoring step with a detection device for monitoring whether the rotorcraft is on the ground;
   a second monitoring step with a control unit for monitoring whether the at least one engine is in the started or on state or in the stopped or off state, and for monitoring a speed of the at least one engine;
   a third monitoring step with a control device for monitoring whether the at least one electric machine is in the on state or in the off state, and for monitoring a speed of the at least one electric machine;
   detecting by the control unit from the second monitoring step that a first engine of the at least one engine is in the on state;
   a first control step with the control unit for controlling the first engine, in response to the rotorcraft being on the ground, so as to lower the speed of the first engine until the speed of the first engine reaches a predetermined speed referred to as a silent speed, the silent speed being either an idling speed of the first engine or a reduced speed of the first engine making it possible to reduce the noise generated by the first engine, the reduced speed being a speed of the first engine that keeps the first engine in the on state; and
   in response to the speed of the first engine being lowered to reach the silent speed, a second control step with the control device for controlling the at least one electric machine so that the at least one electric machine delivers a supplementary mechanical power in addition to mechanical power delivered by the first engine for driving the at least one rotor in rotation while complying with a setpoint speed of rotation of the at least one rotor.

2. The method according to claim 1, wherein the method includes a fourth monitoring step for monitoring the electrical network so as to check that the electrical network is capable of powering the at least one electric machine, an authorization to power the at least one electric machine being issued if the electrical network is capable of powering the at least one electric machine, the authorization to power being necessary for performing the second control step for controlling the at least one electric machine.

3. The method according to claim 2, wherein the method includes an anticipated switch-on step for switching on the at least one electric machine, the at least one electric machine being switched on as soon as the authorization to power is issued, without the at least one electric machine transmitting mechanical power to the at least one rotor.

4. The method according to claim 1, wherein the method includes a determination step for determining a speed of the wind around the rotorcraft, and, if the speed of the wind is greater than a predetermined limit, the second control step for controlling the at least one electric machine either is not performed or is stopped.

5. The method according to claim 1, wherein the at least one engine is a plurality of engines, at least one engine of the plurality of engines other than the first engine is also in the on state, and the first control step is applied to all of the engines of the plurality of engines that are in the on state.

6. The method according to claim 1, wherein the at least one engine is a plurality of engines, at least a second engine of the plurality of engines is also in the on state, only the first engine is situated in a zone of the aircraft where the noise level is to be reduced, and the first control step is applied only to the first engine.

7. The method according to claim 1, wherein the at least one engine is a plurality of engines, at least one engine of the plurality of engines other than the first engine is also in the on state, and during the second control step, the at least one electric machine is regulated on the setpoint speed of rotation of the at least one rotor so that the at least one electric machine delivers mechanical power in addition to mechanical power delivered by the engines of the plurality of engines that are in the on state.

8. The method according to claim 1, wherein the method includes a first prior step for arranging one electric machine of the at least one electric machine in place of one engine of the at least one engine or on a mechanical power take-up of the rotorcraft, the mechanical power take-up making it possible for the at least one rotor to be driven by the one electric machine.

9. The method according to claim 1, wherein the method includes a second prior step for plugging an electrical energy source into a ground power receptacle on the rotorcraft, the ground power receptacle being connected to the at least one electric machine for the purpose of electrically powering the at least one electric machine.

10. The method according to claim 1, wherein the method includes a protection step made up of the following sub-steps:
   a determination sub-step for determining a speed of rotation of at the least one rotor; and
   a switch-off sub-step for switching off the at least one electric machine if the speed of rotation is greater than a predetermined speed.

11. A method of optimizing the noise generated by a rotorcraft on the ground, the rotorcraft including a hybrid power plant provided with an engine and with an electric machine, a rotor driven in rotation with mechanical power from the hybrid power plant, and an electrical energy source electrically powering the electric machine via an electrical network, the method comprising:
   performing with a detector device a first monitoring step for monitoring whether the rotorcraft is on the ground;
   detecting by the detector device from the first monitoring step that the rotorcraft is on the ground;
   performing with a control unit a second monitoring step for monitoring whether the engine is in the started or on state or in the stopped or off state, and for monitoring a speed of the engine;
   detecting by the control unit from the second monitoring step that the engine is in the on state;
   performing with a control device a third monitoring step for monitoring whether the electric machine is in the on state or in the off state, and for monitoring a speed of the electric machine;
   in response to the rotorcraft being on the ground and the engine being in the on state, performing with the control unit a first control step for controlling the engine so as to lower the speed of the engine until the speed of the engine reaches a predetermined speed referred to as a silent speed, the silent speed being either an idling speed of the engine or a reduced speed of the engine making it possible to reduce the noise generated by the engine, the reduced speed being a speed of the engine that keeps the engine in the on state; and in response to the speed of the engine being lowered to reach the silent speed, performing with the control device a second control step for controlling the electric machine so that the electric machine delivers mechanical power supplementary to any mechanical power delivered by the engine for driving the rotor in rotation while complying with a setpoint speed of rotation of the rotor.

12. The method of claim 11 further comprising:
performing by a wind sensor a determination step for determining a speed of the wind around the rotorcraft;
determining by the wind sensor that the speed of the wind is greater than a predetermined limit; and
while the speed of the wind is greater than the predetermined limit, stopping the electric machine from delivering the mechanical power supplementary to any mechanical power delivered by the engine.

13. The method of claim 11 wherein the hybrid power plant of the rotorcraft is provided with a plurality of engines and each of the engines is in the on state, the method further comprising:
performing with the control unit the first control step for controlling each engine so as to lower the speed of each engine until the speed of each engine reaches the silent speed; and
performing with the control device the second control step for controlling the electric machine so that the electric machine delivers mechanical power supplementary to any mechanical power delivered by the engines for driving the rotor in rotation while complying with the setpoint speed of rotation of the rotor.

14. The method of claim 11 wherein the hybrid power plant of the rotorcraft is provided with a plurality of engines, each of the engines is in the on state, and each of the engines are located in different zones of the rotorcraft, the method further comprising:
performing with the control unit the first control step for controlling a given one of the engines located in a zone of the rotorcraft where noise level is to be reduced so as to lower the speed of the given one of the engines until the speed of the given one of the engines reaches the silent speed; and
performing with the control device the second control step for controlling the electric machine so that the electric machine delivers mechanical power supplementary to any mechanical power delivered by the given one of the engines for driving the rotor in rotation while complying with the setpoint speed of rotation of the rotor.

15. A rotorcraft comprising:
a hybrid power plant provided with one or more engines and with an electric machine;
a rotor driven in rotation with mechanical power from the hybrid power plant;
an electrical energy source electrically powering the electric machine via an electrical network;
a detector device configured to monitor whether the rotorcraft is on the ground;
a control unit configured to monitor whether each of the one or more engines is in the started or on state or in the stopped or off state and to monitor a speed of each of the one or more engines;
a control device configured to monitor whether the electric machine is in the on state or in the off state and to monitor a speed of the electric machine;
the control unit further configured to, in response to the rotorcraft being on the ground and at least one of the one or more engines being in the on state, control each engine in the on state so as to lower the speed of each engine in the on state until the speed of each engine in the on state reaches a predetermined speed referred to as a silent speed, the silent speed being either an idling speed or a reduced speed making it possible to reduce engine noise, the reduced speed of a given engine being a speed that keeps the given engine in the on state; and
the control device further configured to, in response to the speed of each engine in the on state being lowered to reach the silent speed, control the electric machine so that the electric machine delivers mechanical power supplementary to any mechanical power delivered by each engine in the on state for driving the rotor in rotation while complying with a setpoint speed of rotation of the rotor.

16. The rotorcraft of claim 15 further comprising:
a wind sensor configured to determine a speed of the wind around the rotorcraft; and
the control device further configured to, while the speed of the wind is greater than a predetermined limit, stop the electric machine from delivering the mechanical power supplementary to any mechanical power delivered by each engine in the on state.

17. The rotorcraft of claim 15 wherein:
the one or more engines of the hybrid power plant is a plurality of engines, the engines being located in different zones of the rotorcraft; and
the control unit further configured to control each engine located in a zone of the rotorcraft where noise level is to be reduced so as to lower the speed of the engine until the speed of the engine reaches the silent speed; and
the control device further configured to control the electric machine so that the electric machine delivers mechanical power supplementary to a total of any mechanical power delivered by each engine located in a zone of the rotorcraft where noise level is to be reduced for driving the rotor in rotation while complying with the setpoint speed of rotation of the rotor.

18. The rotorcraft of claim 15 wherein:
the one or more engines includes a gas turbine engine or a turboshaft engine.

* * * * *